April 24, 1962 P. FOX 3,031,205
ANTI-JACKKNIFE FIFTH WHEEL
Filed Dec. 22, 1960 2 Sheets-Sheet 1
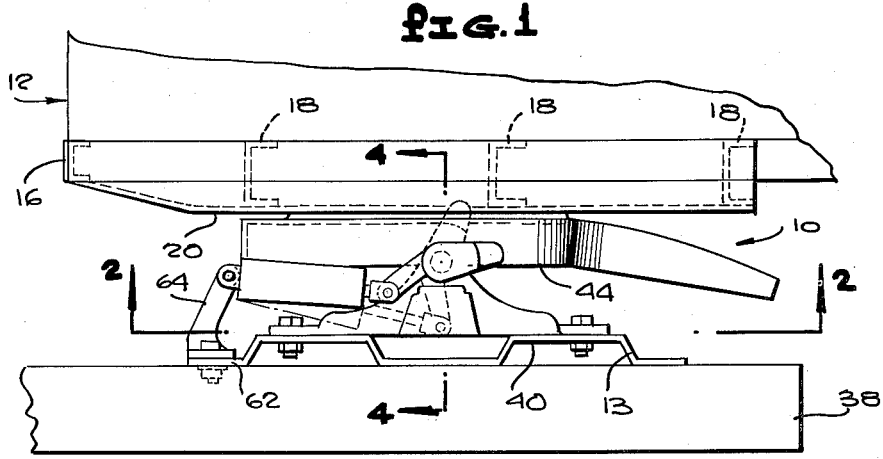
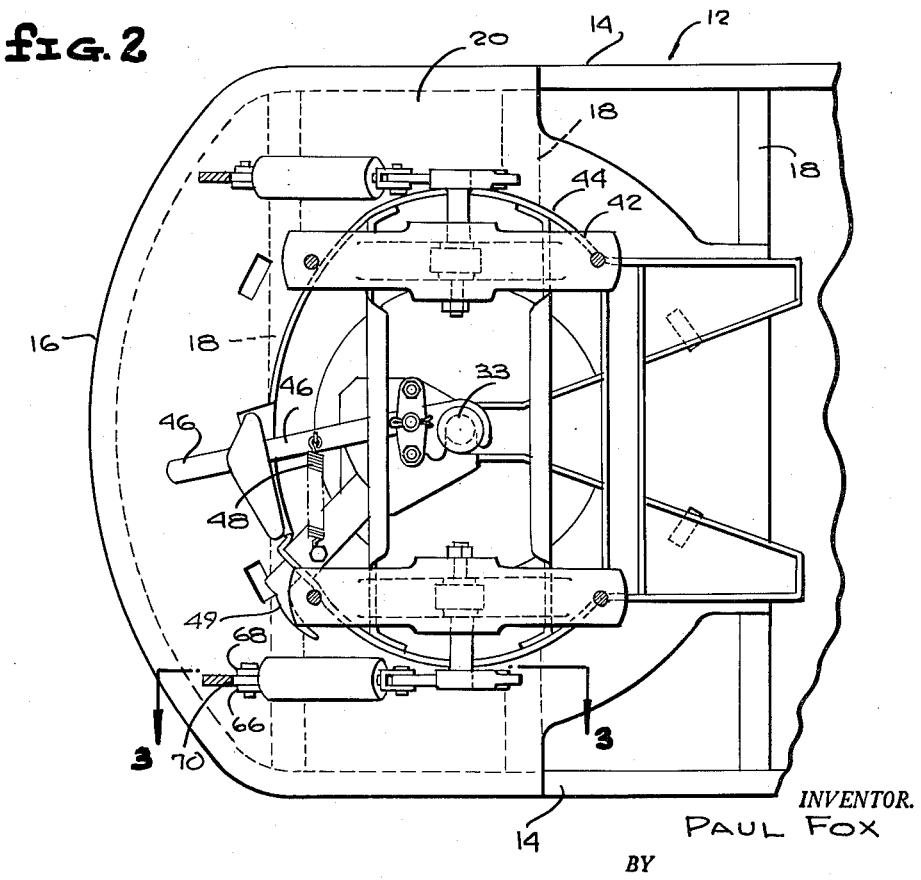
INVENTOR.
PAUL FOX
BY
McMorrow, Berman & Davidson
ATTORNEYS April 24, 1962 P. FOX 3,031,205
ANTI-JACKKNIFE FIFTH WHEEL
Filed Dec. 22, 1960 2 Sheets-Sheet 2
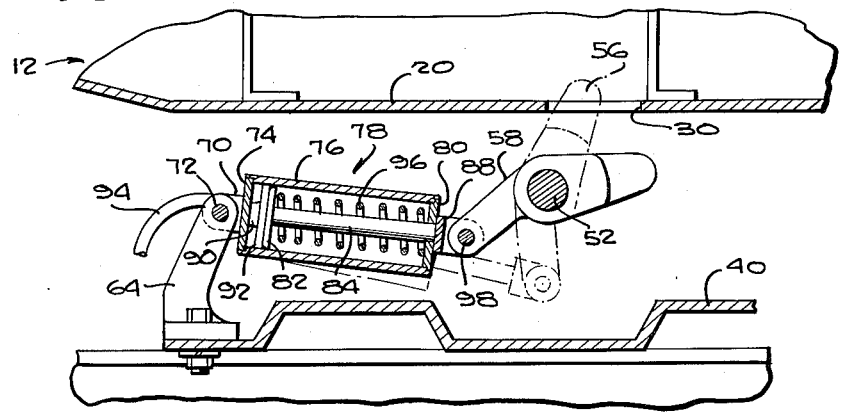
fig.3
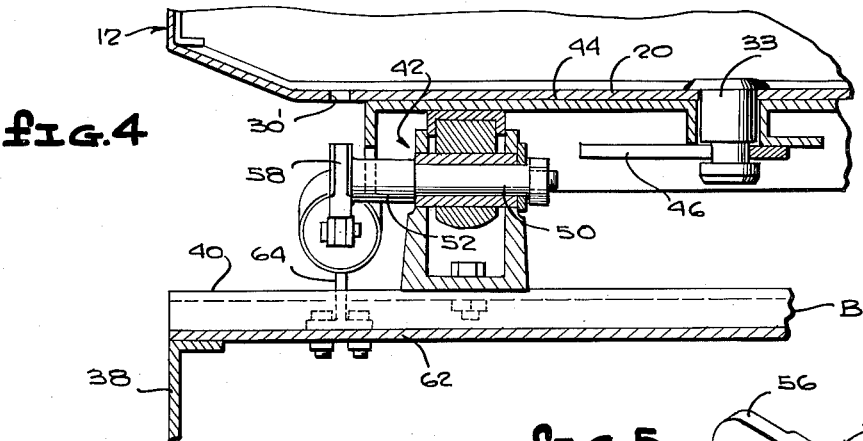
fig.4
fig.5
fig.6
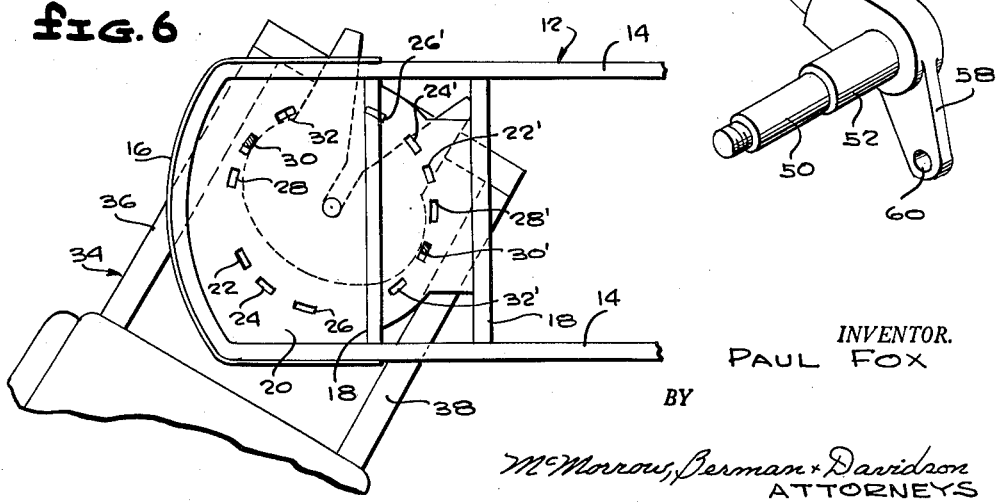
INVENTOR.
PAUL FOX
BY
McMorrow, Berman & Davidson
ATTORNEYS

United States Patent Office 3,031,205
Patented Apr. 24, 1962

3,031,205
ANTI-JACKKNIFE FIFTH WHEEL
Paul Fox, Pleasant St., Brookfield, N.Y.
Filed Dec. 22, 1960, Ser. No. 77,732
4 Claims. (Cl. 280—432)

This invention pertains to a fifth wheel construction and, more specifically, the instant invention is directed to an anti-jackknife fifth wheel of the type which provides connecting means between tractors or trucks and the conventionally known trailers or semi-trailers.

One of the primary objects of this invention is to provide in a tractor-trailer combination, for example, means for preventing pivotal movement of the truck relative to the trailer to thereby prevent jackknifing.

A further object of this invention is to provide anti-jackknife fifth wheel means for a truck-trailer combination, the means being operable through the conventional brake pedal provided in such combinations.

Another object of this invention is to provide a fifth wheel anti-jackknifing means for a truck-trailer combination wherein normal turning movement is permitted between the truck and trailer and wherein the anti-jackknifing means becomes operable upon the application of the brakes in an emergency period such as, for example, during a skid, the means becoming operable to lock the truck and trailer together at an angle and to prevent jackknifing.

A still further object of this invention is to provide anti-jackknifing means which is readily and easily attached to the usual truck and trailer construction and in which extensive alterations to the fifth wheel construction is eliminated. This invention contemplates, as a still further object thereof, fifth wheel anti-jackknifing means for a truck-trailer combination, the means being inexpensive to manufacture and assemble, non-complex in construction, and durable in use.

Other and further objects and advantages of the present invention will be more evident from a consideration of the following specification in the light of the annexed drawings, in which:

FIGURE 1 is a partial side elevational view of the chassis of a truck-trailer combination illustrating the conventional fifth wheel coupling therebetween, and showing the installment of anti-jackknife means in accordance with this invention;

FIGURE 2 is a bottom plan view, FIGURE 2 being taken substantially on the horizontal plane of line 2—2 of FIGURE 1, looking in the direction of the arrows;

FIGURE 3 is an enlarged fragmentary detail cross-sectional view, FIGURE 3 being taken substantially on the horizontal plane of the line 3—3 of FIGURE 2, looking in the direction of the arrows, FIGURE 3 illustrating in full lines the inoperative position of the anti-jackknife means and in dotted lines the operative position of the anti-jackknifing means;

FIGURE 4 is an enlarged detail cross-sectional view, FIGURE 4 being taken substantially on the vertical plane of line 4—4 of FIGURE 1, looking in the direction of the arrows;

FIGURE 5 is an enlarged perspective view of the anti-jackknifing lock lever; and FIGURE 6 is a top plan view of a truck and trailer chassis with the lock lever of the anti-jackknifing fifth wheel in its operative position to prevent the jackknifing of the truck and trailer.

Referring now more specifically to the drawings, the reference numeral 10 designates, in general, an anti-jackknifing device for a combined truck and trailer or for analogous combinations of automotive vehicles, the same being constructed and being operable in accordance with the teachings of this invention.

A trailer or semi-trailer is denoted by reference numeral 12 and includes the usual chassis having longitudinally extending side frame members 14, the side frame members 14 having a pair of adjacent ends thereof joined by a front end frame member 16, and a plurality of reinforcing spacer members 18. The trailer chassis has secured to the forward end the usual apron plate 20 rigidly secured to the aforementioned frame members. For purposes to be described, the apron plate 20 is formed with a plurality of opposed pairs of openings 22, 22'; 24, 24'; 26, 26'; 28, 28'; 30, 30'; and 32, 32'. A kingpin 33 depends from the apron 20 and is rigidly connected thereto.

The tractor, designated in general by reference numeral 34, includes a pair of longitudinally extending side frame members 36, 38, transversely across which extends a support plate 40 on which is mounted adjacent each side of the plate 40, conventional side arm shackles 42, the latter being secured to and supporting the usual fifth wheel 44. The fifth wheel 44 is provided with the usual kingpin lock lever 46, the lock spring 48, and hook latch handle 49.

The shackles 42 are supported on shafts 50 that are integral with outwardly extending stub shafts 52, the latter being aligned with their respective associated shafts and terminate at their respective outer ends in integrally formed bell-crank lock lever 54 having ends 56, 58. The length of each stub shaft is such as to position the levers beyond the outer periphery of the fifth wheel 44. The stub shafts 52 are each of a diameter greater than the diameter of their respective associated shafts 50. To serve a purpose to be described, each of the ends 58 of the levers 54 is provided with a transversely extending opening 60.

As seen in the drawings, each side of the fifth wheel 44 and fixedly secured to the forward flange 62 of the plate 40 is an upright bracket 64. The upper end of the bracket 64 is bifurcated and receives between the arms 66, 68, thereof an annular lug 70. The lug 70 is pivotally connected to the arms 66, 68 by means of a pivot pin 72.

As is clearly seen in the drawings, the lug 70 is fixedly secured to the end wall 74 of the casing 76 forming a part of an air cylinder 78. The other end of the air cylinder 78 is closed by means of an end wall 80.

A piston 82 is disposed within the air cylinder 78 and is adapted to reciprocate therein. One end of a piston rod 84 is fixedly connected to the piston 82, and the other end of the rod 84 extends through the end wall 80 and has rigidly affixed thereto a clevis 88. As is seen in FIGURE 3 of the drawings, the piston 82 is formed with a protuberance 90 which projects toward the end wall 74 and is adapted to engage thereagainst to space the piston 82 therefrom and provide an inner chamber 92 therebetween. An air conduit 94 is connected with the air cylinder 78 intermediate the piston 82 and the end wall 74. Disposed within the air cylinder 78 on that side of the piston 82 opposite to the air chamber 92 is a helicoidal spring 96 which surrounds the piston rod 84 with one of its ends engaging against the piston 82 and its other end engaging against the end wall 80. The arrangement is such that the spring 96 constantly biases the piston 82 for movement towards the end wall 74.

The clevis 88 receives therebetween the other end of the arm 58 of the bell-crank lever 54 and is pivotally connected thereto by means of a pivot pin 98.

It is obvious from the foregoing description that as air under pressure is supplied to the chamber 92 through the conduit 94 the piston 82 will be forced to move toward the end wall 80 against the tension of the spring 96. As this movement takes place, the piston rod 84 will be extended to cause the bell-crank lever 54 and the air cylinder 78 and its associated component elements to move from the full line position shown in FIGURE 3 to the dotted line positions thereof. The end 56 of each of the bell-crank levers 54 will thus be forced to turn in a counter-clockwise, or upper direction, reference being made to FIGURE 3 of the drawings.

The conduit 94 is optionally connected with the conventional air brake system of the towing vehicle or truck, or the same may be supplied through a manually controlled dashboard mounted control lever, the lever, of course, actuating a valve connected in the air system of the truck.

The operation of the jackknifing device described above and illustrated in the drawings is deemed to be self-evident from the above description and accompanying drawings, however, a brief description of its operation is set forth below.

Assuming that the conduit 94 is connected to the air brake system of the truck 34, and that the truck 34 and trailer 12 are aligned, application of air under pressure to the brakes will cause the bell-crank lever 54 to pivot in a counterclockwise direction, as viewed in FIGURES 1, 3 and 4. The ends 56 of the bell-crank lever 54 were then engaged against the apron 20 and, during moderate relative angular movement between the truck and trailer, the ends 56 will merely slide thereon. However, when the relative angular movement becomes severe, that is, approaches or reaches thirty degrees, and with the brakes "on," and let it be further assumed that the trailer 12 is swinging to the left, as viewed in FIGURE 6 (or in a clockwise direction as viewed therein), the openings 32, 32' will be first engaged by the ends 56 of the bell-crank lever 54. The openings 32, 32' are spaced approximately thirty degrees away from the center line which is perpendicular to the longitudinal axis of the trailer and which extends diametrically through the kingpin 33. If, for some reason, the slewing or turning movement of the truck 34 and the trailer 12 exceeds this angle before the ends 56 engage the openings 32, 32', the ends 56 of the levers 54 slide on the apron 20 until they engage, as shown in FIGURE 6, in the openings 30, 30'. These openings are spaced approximately sixty degrees away from the center line first referred to above. Still further jackknifing, should the ends 56 fail to lock in the openings 30, 30', and with the application of air under pressure to the air cylinders 78, will cause the ends 56 to engage and lock in the openings 28, 28' which are located approximately eighty degrees away from the above referred to first center line. Spacing of the openings may vary, of course, but the above degrees of angularity have proved to be the most satisfactory in the majority of cases.

The air cylinders 78, whether controlled from the brake system or from a separate manually operated lever controlled valve, is provided with a quick exhaust or vent (not shown, but conventional in this art) whereby the piston rod 84 may be quickly moved to the left, as viewed in FIGURE 3, to effect rotation of the levers 54 in the opposite or clockwise direction whereby the ends 56 are withdrawn from the selected pairs of openings and they turn from their doted line positions to their operative full line positions shown in FIGURES 1, 3 and 4.

This invention contemplates the use of electrically operated solenoids as a substitute for the air cylinder 78, connecting the armature thereof to the end 58 of the bell-crank lever 54, the solenoid to be controlled from the brake light electric circuit or from a separate circuit controlled by an independent switch mounted for convenient operation by the truck driver.

Having described and illustrated one embodiment of this invention in detail, it will be understood that the same is offered merely by way of example, and that this invention is to be limited only by the scope of the appended claims.

What is claimed is:

1. In a truck-trailer combination, a fifth wheel for said truck and an apron for said trailer, said apron being superimposed on said fifth wheel, means detachably connecting said apron and said fifth wheel for relative movement about a vertical axis, a shackle mounted on each side of said truck and supporting said fifth wheel, each of said shackles having a shaft projecting exteriorly thereon in opposite directions and projecting beyond the outer periphery of said fifth wheel, a bell-crank lever secured to each of said projecting shafts and having a pair of ends, said apron having a plurality of openings formed therein radially and circumferentially spaced from and about said vertical axis and located beyond the outer periphery of said fifth wheel, said ends of said bell-crank lever being normally disposed below said apron, and means operatively connected to one of said ends of said bell-crank levers to effect pivotal movement of the latter to raise the other ends of said bell-crank levers into engagement with a pair of said openings.

2. In a truck-trailer combination, a chassis for said truck and for said trailer, a support plate mounted upon said chassis, a shackle mounted on said support plate adjacent each side, respectively, of said truck chassis, each of said shackles including a shaft having an outwardly projecting stub shaft, a bell-crank lever fixedly secured to each of said stub shafts, each of said bell-crank levers having a pair of opposed ends, a fifth wheel mounted and secured to said shackles with said bell-crank levers being disposed adjacent opposite sides of said fifth wheel and beyond the outer periphery thereof, an apron fixedly secured to said chassis of said trailer, said apron having a plurality of openings formed therein and extending therethrough, said openings being disposed beyond the outer periphery of said fifth wheel, means detachably connecting said apron with said fifth wheel to provide relative turning movement of said truck and trailer about a vertical axis, an air cylinder for each of said bell-crank levers, means pivotally connecting one of the ends of each of said air cylinders on said support member, said air cylinders each being provided with a reciprocating piston rod, each of said piston rods having ends projecting beyond the other of said ends of said air cylinders, means connecting respectively, the projecting ends of said piston rods with one of the ends of said bell-crank levers, and means for supplying air under pressure to said air cylinders to effect projection of said piston rod and pivotal movement of said bell-crank levers whereby the other of said ends of said bell-crank levers are moved into a pair of said openings.

3. In a truck-trailer combination as defined in claim 2, wherein said air cylinder includes a piston adapted for reciprocation within said cylinder, means for spacing said piston away from said one end of said cylinder, said space between said piston and said one end of said cylinder defining a chamber, means for introducing air under pressure into said chamber, and resilient means disposed within said air cylinder constantly tending to bias said piston for movement towards said one end of said air cylinder.

4. In a truck-trailer combination as defined in claim 3, wherein said resilient means comprises a helicoidal spring surrounding said piston rod and having one of its respective ends engaging against said other end of said air cylinder and the other end of said spring engaging against said piston.

References Cited in the file of this patent

UNITED STATES PATENTS

| | | |
|---|---|---|
| 1,179,793 | Barber | Apr. 18, 1916 |
| 2,073,269 | Skibbe | Mar. 9, 1937 |
| 2,454,626 | Borzell | Nov. 23, 1948 |
| 2,462,211 | Moore | Feb. 22, 1949 |
| 2,485,251 | Alger | Oct. 18, 1949 |
| 2,773,701 | Safko | Dec. 11, 1956 |